United States Patent
Chang et al.

(10) Patent No.: US 7,173,812 B2
(45) Date of Patent: Feb. 6, 2007

(54) BACKLIGHT MODULE AND FEEDBACK CIRCUIT STRUCTURE THEREOF

(75) Inventors: Ching-Lung Chang, Taoyuan County (TW); Yao-Tung Wang, Taoyuan (TW)

(73) Assignee: Chunghwa Picture Tubes, Ltd., Taipei (TW)

(*) Notice: Subject to any disclaimer, the term of this patent is extended or adjusted under 35 U.S.C. 154(b) by 166 days.

(21) Appl. No.: 10/711,860

(22) Filed: Oct. 11, 2004

(65) Prior Publication Data

US 2006/0077658 A1 Apr. 13, 2006

(51) Int. Cl.
*H05K 5/00* (2006.01)
*H01J 9/36* (2006.01)
*H05B 37/00* (2006.01)

(52) U.S. Cl. .................. 361/679; 445/69; 315/312
(58) Field of Classification Search ............... 315/161, 315/167, 169.3, 312, 324; 349/61, 70; 445/66, 445/69; 362/221, 225; 361/679, 728, 748, 361/822; 345/102
See application file for complete search history.

(56) References Cited

U.S. PATENT DOCUMENTS

| | | | |
|---|---|---|---|
| 6,459,203 B1 * | 10/2002 | Kim ........................ | 315/56 |
| 6,857,759 B2 * | 2/2005 | Lee et al. ................ | 362/225 |
| 2004/0124790 A1 * | 7/2004 | Han et al. ................ | 315/291 |
| 2005/0007333 A1 * | 1/2005 | Han et al. ................ | 345/102 |
| 2005/0078080 A1 * | 4/2005 | Kang et al. .............. | 345/102 |

* cited by examiner

*Primary Examiner*—Thuy Vinh Tran
(74) *Attorney, Agent, or Firm*—Jianq Chyun IP Office

(57) ABSTRACT

A backlight module and a feedback circuit structure thereof are provided. The backlight module comprises a plurality of tubes, a driving module, and the feedback circuit structure. The feedback circuit structure comprises a substrate, a plurality of tube contacts, a plurality of independent feedback contacts and at least a common feedback contact. The tube contacts, the independent feedback contacts and the common feedback contact are disposed on the substrate. Each independent feedback contact is electrically connected to one of the tube contacts. The common feedback contact is electrically connected to one of the independent feedback contacts. An independent feedback can proceed by transmitting feedback signals from each independent feedback contact to a corresponding lamp tube. A common feedback can proceed by first coupling the independent feedback contacts together and then transmitting feedback signals from the common feedback contact to a multiple of lamp tubes.

19 Claims, 5 Drawing Sheets

BACKLIGHT MODULE AND FEEDBACK CIRCUIT STRUCTURE THEREOF

BACKGROUND OF THE INVENTION

1. Field of the Invention

The present invention relates to a backlight module and circuit structure thereof. More particularly, the present invention relates to a multi-tube backlight module and feedback circuit structure thereof.

2. Description of Related Art

With the rapid development of electronic industry, electronic products including mobile phones, digital cameras, digital camcorders, notebook computers, desktop computers are striving towards easier operation, more powerful functions and a better appearance. However, all these mobile phones, digital cameras, digital camcorders, notebook computers and desktop computers demand a suitable display screen to serve as a man-machine interface and facilitate various operations. In recent years, liquid crystal display (LCD) panels have become the mainstream display screens for most of the mobile phones, digital cameras, digital camcorders, notebook computers and desktop computers. Because a LCD panel will not emit light on its own, a backlight module must be disposed underneath the display panel to provide a planar light source having a sufficient brightness and contrast for producing a clear image on the screen.

In general, a backlight module can be classified into a side-edge type and a direct-type backlight module. In a side-edge type backlight module, a linear light source is disposed on one side of a light-guiding plate so that light entering the light-guiding plate is transformed into a planar light source for the liquid crystal panel. In the direct type backlight module, light sources are disposed under the liquid crystal panel so that the light sources are able to provide a planar light source directly. Thus, if the demanded brightness level for a liquid crystal panel is high, a direct type backlight module is often deployed. At present, there are two major methods for constructing the planar light source of a direct type backlight module. One type of backlight module utilizes an array of light-emitting diodes to form the planar light source while another type of backlight module utilize a plurality of parallel-aligned cold cathode fluorescent lamps (CCFL) (also referred to as a multi-tube backlight module in the following).

The cold cathode fluorescent lamps (CCFL) of a conventional multi-tube backlight module are driven by an alternating current power source. The powering device connects all the power terminals of the CCFL to provide a driving current to all the CCFL. To gauge the actual current passing through the tube and maintain a constant light emission, the low voltage terminal (the feedback terminal) of each CCFL is equipped with a feedback circuit for transmitting a feedback signal to a feedback control device (for example, a pulse width modulation (PWM) controller). Through the feedback signal from the tube, the feedback control device senses the current flowing inside the tube and controls the power source in real time to provide a compensating feedback current so that the CCFL can maintain a constant output.

FIG. 1 is schematic circuit diagram of a conventional multi-tube backlight module. As shown in FIG. 1, the multi-tube backlight module 100 comprises a plurality of cold cathode fluorescent lamps (CCFL), a driving module 120 and a plurality of feedback lines 130. The driving module 120 further comprises a powering device 122 and a feedback control device 124. The powering device 122 is coupled to a power terminal 112 of each lamp 110. The power device 122 is capable of converting a direct current power source into an alternating power source for driving the CCFL 110. Furthermore, a feedback terminal (low voltage terminal) 114 of each CCFL is coupled to the feedback control device 124 through the feedback line 130 for transmitting a feedback signal to the feedback control chip 124. After receiving the feedback signal, the feedback control device 124 provides a feedback compensation of the driving current so that a constant output from the CCFL 110 is maintained.

It should be noted that the aforementioned multi-tube backlight module has an independent feedback mechanism. In other words, each cold cathode fluorescent tube has a feedback line for transmitting a feedback signal to the driving module. One major advantage is that the current in each CCFL can be accurately detected so that precise feedback compensation is possible. On the other hand, more feedback lines and connecting components are required. Hence, the circuit is more complicated and costly to fabricate.

FIG. 2 is a schematic circuit diagram of another conventional multi-tube backlight module. As shown in FIG. 2, the multi-tube backlight module 200 uses common ground feedback to control the cold cathode fluorescent tube 210. The cold cathode fluorescent tubes 210 are divided into two groups. The CCFL 210 in each group utilizes a single feedback line 230 to connect with a feedback control device 224 inside a driving module 220 so that the feedback control device 224 is capable of compensating the driving current to each group of CCFL 210. Although the common ground feedback method is able to lower the production cost and simplify the feedback circuits, the detected feedback current is that of a group of CCFL and hence precise control of each CCFL is impossible. Furthermore, interference between neighboring cold cathode fluorescent tubes is also possible.

In other words, the two aforementioned feedback systems have its advantages as well as its disadvantages. In general, the type of backlight module chosen depends on cost and quality requirements. However, because the two feedback types have different feedback terminals and circuit layouts, a different circuit board is required. Since the same feedback circuit cannot be used in backlight module having a different feedback system, a new circuit has to be designed and developed.

SUMMARY OF THE INVENTION

Accordingly, the present invention is directed to a feedback circuit structure of a backlight module adapted to independent feedback and common ground feedback and capable of switching between the feedback types. Hence, a greater design variation is permitted to boost product competence in the market.

The present invention is also directed to a backlight module adapted to independent feedback and common ground feedback and capable of switching between the feedback types according to demand. Hence, the cost for design change is minimized and market competition of the product is improved.

According to an embodiment of the invention, the feedback circuit structure comprises a substrate, a plurality of tube contacts, a plurality of independent feedback contacts and at least a common feedback contact. The tube contacts, the independent feedback contacts and the common feedback contact are disposed on the substrate. Each independent feedback contact is electrically connected to one of the tube contacts. The common feedback contact is electrically connected to one of the independent feedback contacts.

The present invention also directed to a backlight module. The backlight module comprises a plurality of lamp tubes, a driving module, the aforementioned feedback circuit structure and a plurality of feedback lines. Each lamp tube has a power terminal and a feedback terminal. The driving module is coupled to the power terminal for driving the lamp tubes and the tube contacts of the feedback circuit structure are coupled to the feedback terminal of the lamp tubes. Furthermore, the feedback lines connect individual feedback contacts with the driving module for transmitting feedback signals from each lamp tube to the driving module so that the driving module can provide appropriate feedback to control each lamp tube.

The present invention also directed to a backlight module comprising a plurality of lamp tubes, a driving module, the aforementioned feedback circuit structure and at least a feedback line. Each lamp tube has a power terminal and a feedback terminal. The driving module is coupled to the power terminal for driving the lamp tubes and the tube contacts of the feedback circuit structure are coupled to the feedback terminal of the lamp tubes. Furthermore, the plurality of independent feedback contacts of the feedback circuit structure is mutually conductive. The feedback lines connect the common ground contacts with the driving module for transmitting multi-tube feedback signals to the driving module so that the driving module can provide a common ground feedback to control of the lamp tubes.

In brief, the backlight module and the feedback circuit structure of the present invention provides circuits for executing independent feedback control as well as common ground feedback control so that either type of feedback operation can be selected by flipping a switch. Hence, the time and money needed to design and fabricate an alternative type of feedback circuit system is saved while the display quality of the liquid crystal panel is improved.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
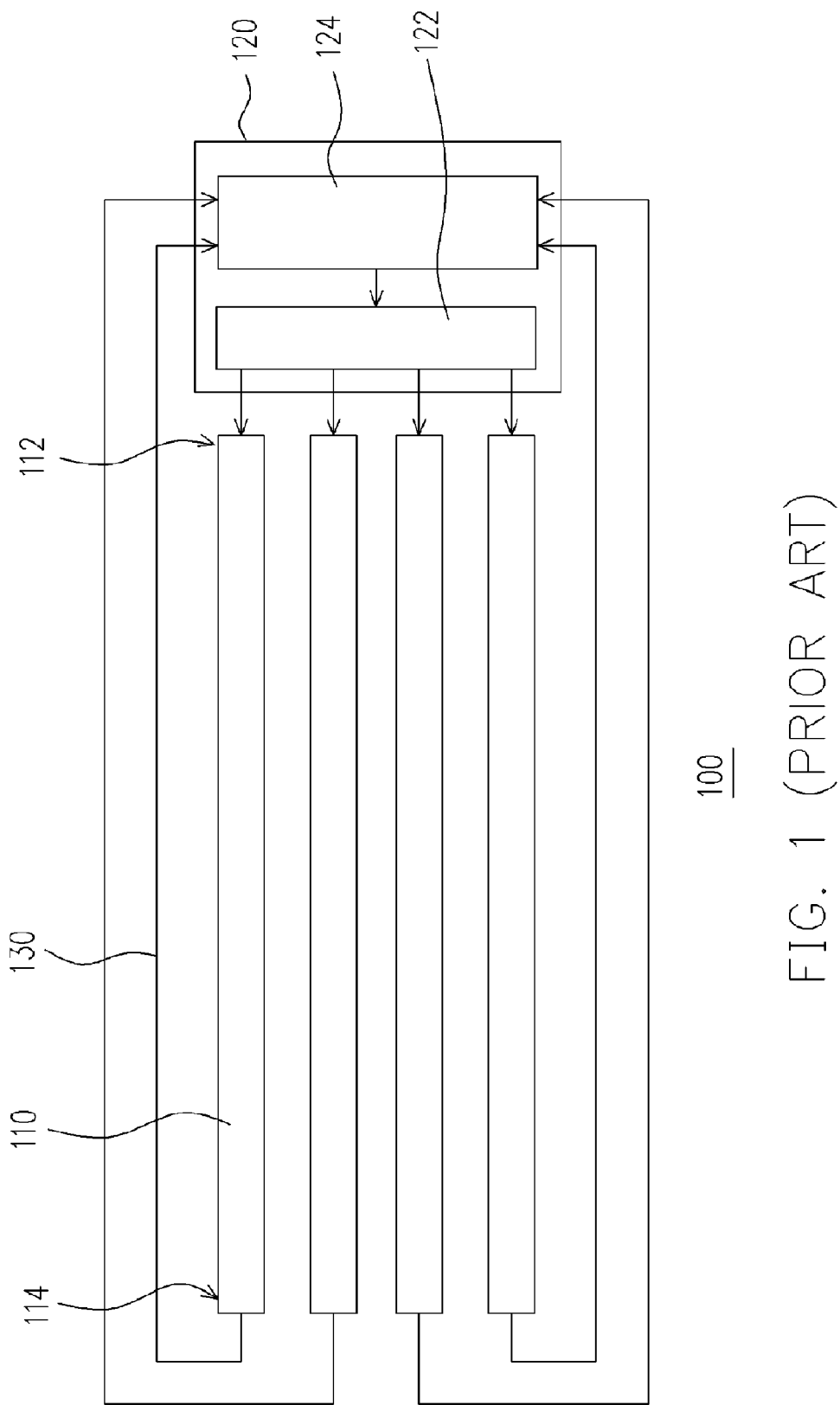
FIG. 1 is schematic circuit diagram of a conventional multi-tube backlight module.
Figure 2:
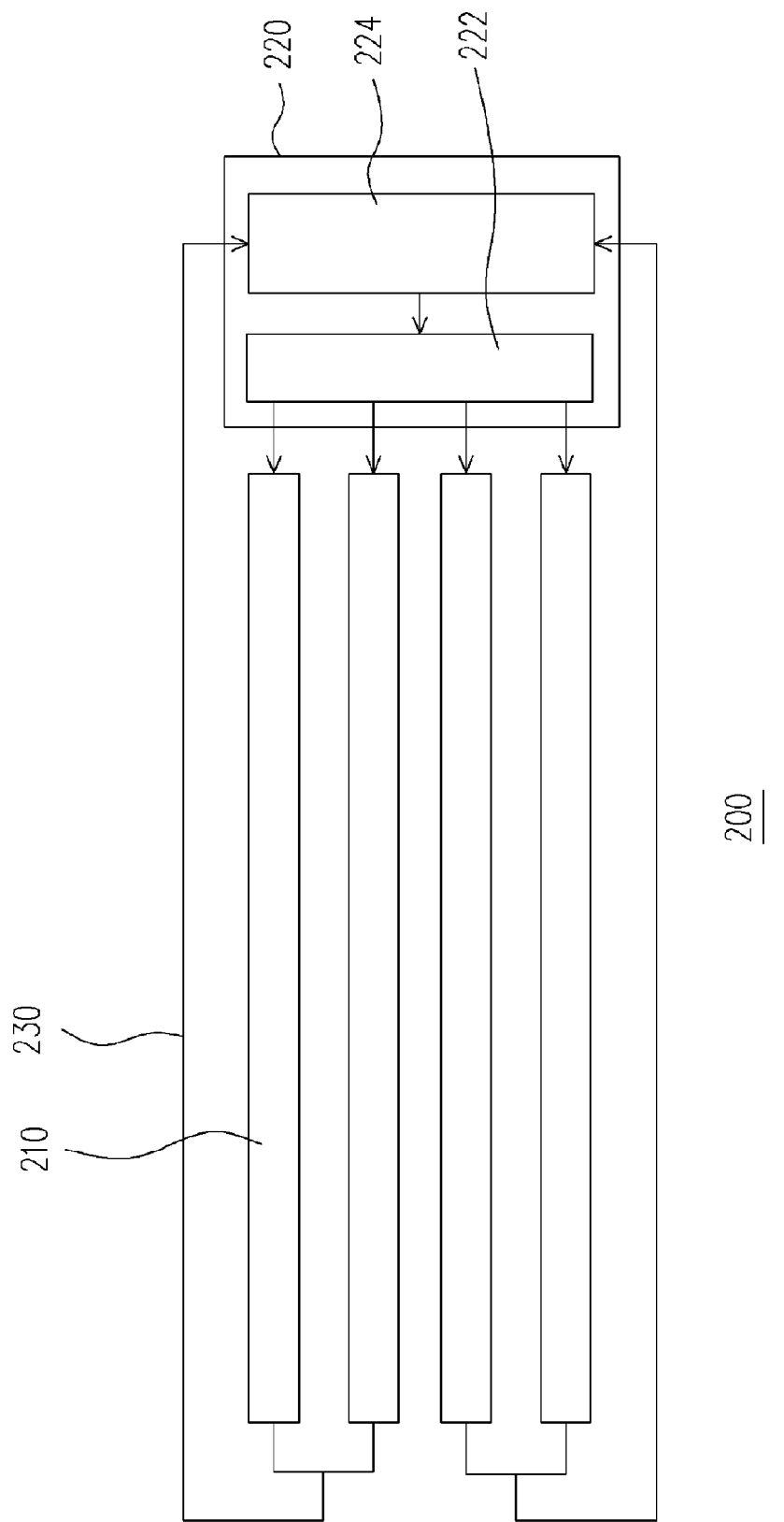
FIG. 2 is a schematic circuit diagram of another conventional multi-tube backlight module.

Reference will now be made in detail to the present preferred embodiments of the invention, examples of which are illustrated in the accompanying drawings. Wherever possible, the same reference numbers are used in the drawings and the description to refer to the same or like parts.

Figure 3:
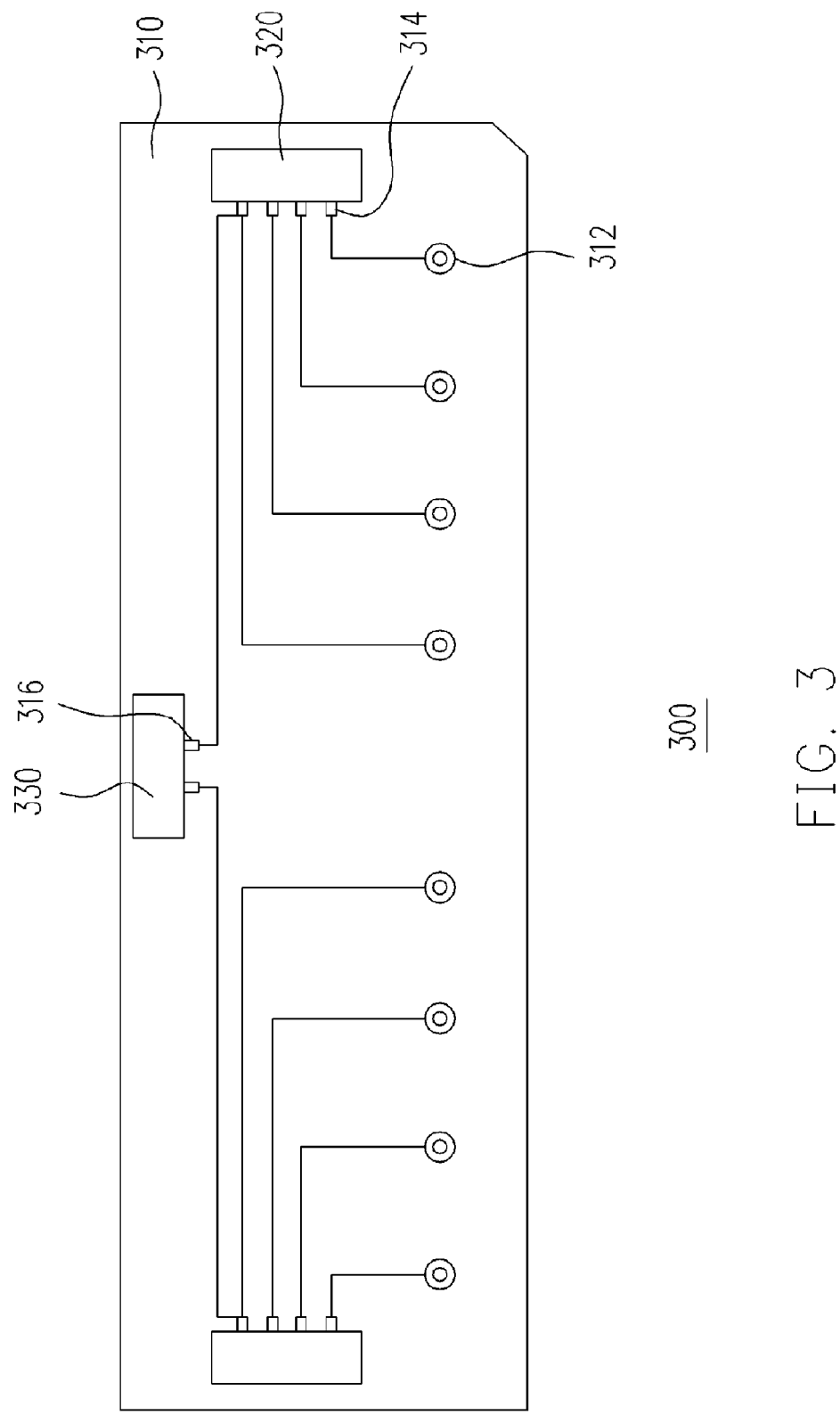
FIG. 3 is a schematic circuit diagram of a feedback circuit structure of a backlight module according to one embodiment of the present invention.

FIG. 3 is a schematic circuit diagram of a feedback circuit structure of a backlight module according to one embodiment of the present invention. As shown in FIG. 3, the feedback circuit structure 300 comprises a substrate 310, a plurality of independent feedback plugging stands 320 and a common ground feedback plugging stand 330. The substrate 310 has a plurality of tube contacts 312, a plurality of independent feedback contacts 314 and a plurality of common ground feedback contacts 316. The tube contacts 312 are used for connecting with the feedback terminals (not shown) of a plurality of cold cathode fluorescent lamps (CCFL). The independent feedback contacts 314 are coupled to the independent feedback stand 320 for connecting with corresponding tube contacts 312. It should be noted that the number of independent feedback plugging stands 312 used in the present invention is based on the number of cold cathode fluorescent lamps (not shown) and the number of leads provided by each independent feedback plugging stand 320. For example, the number of tube contacts 312 shown in FIG. 3 is able to connect with 8 lamp tubes. The lamp tubes can be divided into two groups so that four of them are connected to the independent feedback contacts 314 on each independent feedback plugging stand 320. Obviously, in other embodiments, a plugging stand having more leads or less leads can be selected so that the number of plugging stands in the feedback circuit structure 30 is really a variable.

The common ground feedback plugging stand 330 is disposed above the common ground feedback contacts 316. Furthermore, each common ground feedback contact 316 is connected to one of the independent feedback contacts 314 of a corresponding independent feedback plugging stand 320. It should be noted that the number of common ground feedback plugging stands 330 in the present invention may vary according to the number of leads each one can provide. The number of common ground feedback contacts 316 corresponds to the number of independent feedback plugging stands 320.

Accordingly, independent feedback contacts 314 for independent feedback operation and common ground feedback contacts 316 for common ground feedback operation are disposed on the substrate 310 of the present invention to retain variability in the design. To execute independent feedback control, each independent feedback contact 314 is coupled to a feedback line (not shown) through the independent feedback plugging stand 320 to obtain a feedback signal from each lamp tube (not shown). Since the common ground feedback plugging stand 330 are unused when independent feedback control is deployed, the common ground feedback plugging stand 330 can be deleted to save production cost so that only the common ground feedback contacts 316 remain on the substrate 310 for subsequent design changes.

To execute common ground feedback control, the independent feedback contacts 314 are connected together and the common ground feedback contacts 316 are connected to the feedback lines (not shown) so that an average feedback signal from the plurality of lamp tubes (not shown) is obtained. In the embodiment of the present invention, the method of connecting various independent feedback contacts 314 together includes plugging a conductive cap over the independent feedback plugging stand 320. Obviously, the independent feedback plugging stands 320 can be deleted to save production cost when the common ground feedback control is in use. Furthermore, the methods of connecting various independent feedback contacts 314 may include covering the independent feedback contacts 314 with solder blocks, conductive plastics or bridging with metallic material, for example.

Figure 4:
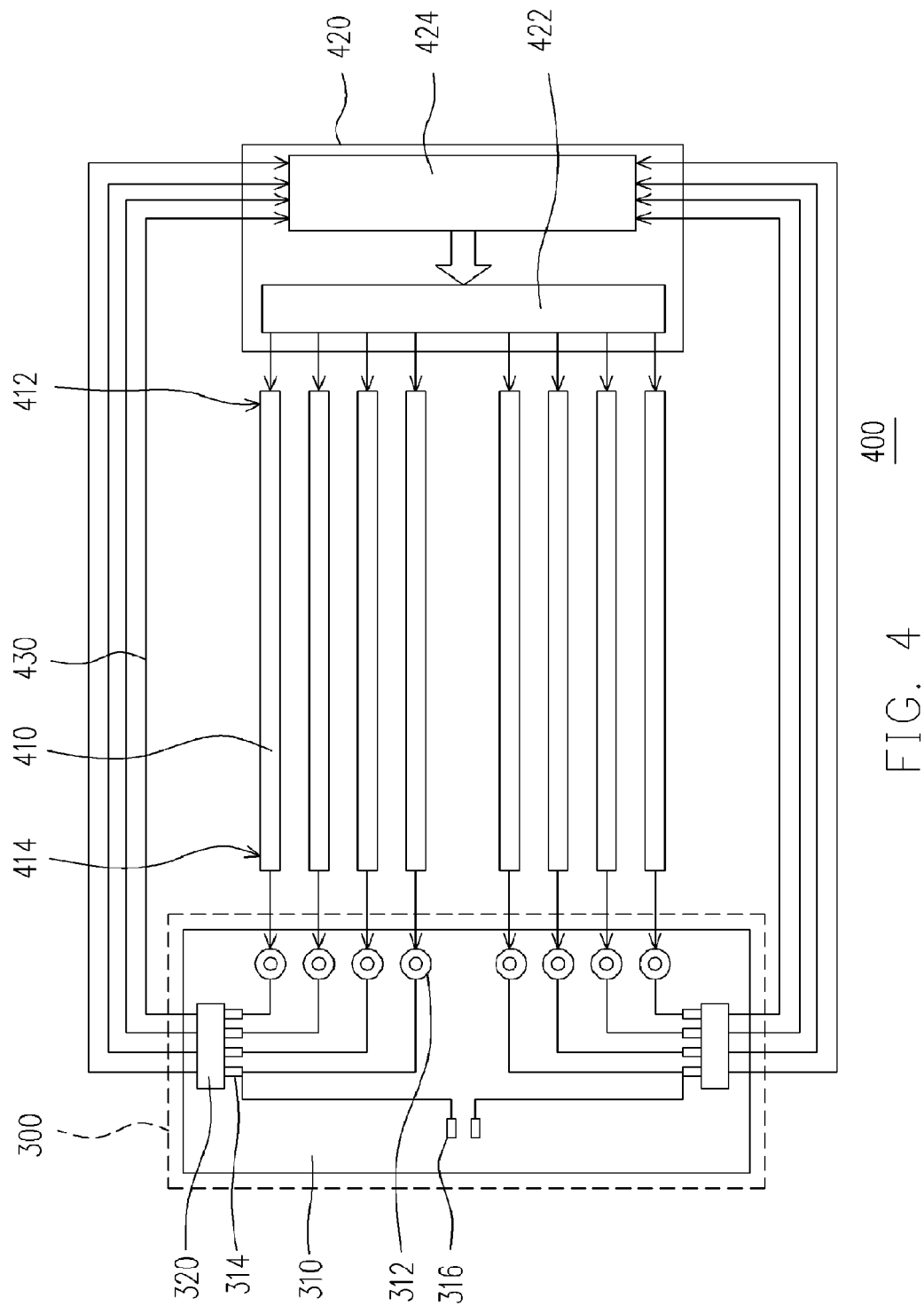
FIG. 4 is a schematic circuit diagram of a backlight module that deploys an independent feedback control system according to one embodiment of the present invention.

FIG. 4 is a schematic circuit diagram of a backlight module that deploys an independent feedback control system according to one embodiment of the present invention. To simplify explanations, the components in FIG. 4 identical to the ones in FIG. 3 are labeled with the same reference number. As shown in FIG. 4, the backlight module 400 comprises a plurality of cold cathode fluorescent lamps 410, a driving module 420, a plurality of feedback lines 430 and a feedback circuit structure 300. The driving module 420 comprises a powering device 422 and a feedback controller 424. The powering device 422 is a DC-AC inverter coupled to the power terminal 412 of each cold cathode fluorescent lamp 410 so that the lamps 410 are driven by an alternating current. Furthermore, the feedback controller 424 is a pulse width modulation (PWM) controller for receiving feedback signals from the cold cathode fluorescent lamps 410 and controlling the feedback current.

The feedback terminal 414 of each cold cathode fluorescent lamp 410 is coupled to a corresponding tube contact 312 on the substrate 310. The feedback lines 430 are coupled to the independent feedback contacts 314 through the independent feedback plugging stands 320. Therefore, each cold cathode fluorescent lamp 410 can transmit a feedback signal to the feedback controller 424 within the driving module 420 through the feedback lines 430. Through the feedback signal, the feedback controller 424 is able to detect the current flowing into the cold cathode fluorescent lamp 410 in real time so that the power device 422 is instructed to provide an appropriate feedback current to the lamp 410 for maintaining a steady output. It should be noted that no common ground feedback plugging stand 330 is installed on the substrate 310 of the feedback circuit structure 300 to save production cost because independent feedback control is deployed in the backlight module 400.

Figure 5:
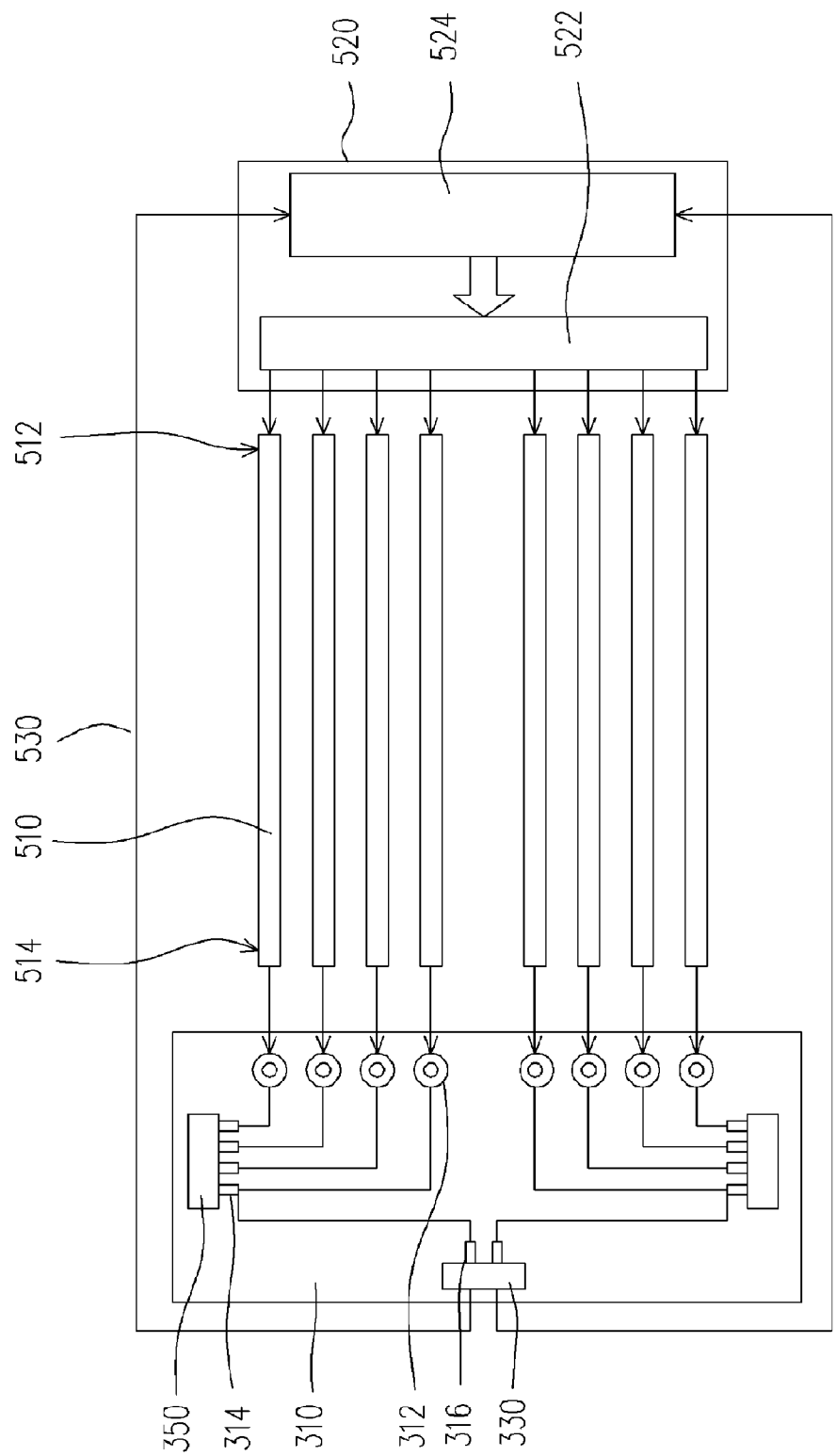
FIG. 5 is a schematic circuit diagram of a backlight module that deploys a common ground feedback control system according to one embodiment of the present invention.

FIG. 5 is a schematic circuit diagram of a backlight module that deploys a common ground feedback control system according to one embodiment of the present invention. To simplicity, the components in FIG. 5 identical to the ones in FIG. 3 are labeled with the same reference number. As shown in FIG. 5, the powering device 522 of the driving module 520 is coupled to the power terminal 512 of each cold cathode fluorescent lamp 510. The feedback terminals 514 of the cold cathode fluorescent lamp 510 are coupled to various tube contacts 312 on the substrate 310. In addition, the substrate 310 further comprises independent feedback contacts 314 and common ground feedback contacts 316. The independent feedback contacts 314 are divided into two groups with the independent feedback contacts 314 in each group electrically connected together through a conductive material 350 including, for example, conductive plastics, solder blocks, metal or other conductive materials. The common ground feedback contacts 316 are disposed on the common ground feedback plugging stand 330.

The feedback lines 530 couple the common ground feedback contacts 316 with the feedback controller 524 through the common ground feedback plugging stand 330. Through a feedback line 530, each common ground feedback contact 316 is permitted to transmit an average feedback signal of a group of cold cathode fluorescent lamps 510 to the feedback controller 524 so that the feedback controller 524 can provide a feedback driving current. In general, the number of feedback lines 530 may change according to the number of common ground feedback contacts 316. It should be noted that the backlight module 500 of the present invention deploys a common ground feedback control. To reduce the total production cost, no independent feedback plugging stand 320 (shown in FIG. 3) is disposed on the independent feedback contacts 314. Obviously, in another embodiment, independent feedback plugging stands 320 (as shown in FIG. 3) can be installed over the independent feedback contacts 314. Furthermore, the method of connecting various independent feedback contacts 314 together includes plugging a conductive cap (not shown) over the independent feedback plugging stands (shown in FIG. 3).

In summary, the backlight module and feedback circuit structure of the present invention retain both the independent feedback and the common ground feedback control so that the type of feedback control can be selected on demand without affecting the design of other devices and circuits. Thus, the backlight module and its feedback circuit structure permit greater design changes to meet wider range of product quality and cost requirements. With a greater flexibility for design changes at no additional cost, the backlight module has an addition edge in the competitive marketplace.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A feedback circuit structure for a backlight module, comprising:
 a substrate;
 a plurality of tube contacts, disposed on the substrate;
 a plurality of independent feedback contacts, disposed on the substrate, wherein each independent feedback contact is coupled to one of the tube contacts; and
 a common ground feedback contact, disposed on the substrate such that the common ground feedback contact is coupled to one of the independent feedback contacts.

2. The feedback circuit structure of claim 1, wherein the structure further comprises an independent feedback plugging stand disposed on the substrate such that the independent feedback contacts are coupled to the independent feedback plugging stand.

3. The feedback circuit structure of claim 2, wherein the structure further comprises a conductive cap plugged into the independent feedback plugging stand for connecting the independent feedback contacts together.

4. The feedback circuit structure of claim 1, wherein the structure further comprises a common ground feedback plugging stand disposed on the substrate such that the common ground feedback contacts are coupled to the common ground feedback plugging stand.

5. The feedback circuit structure of claim 1, wherein the structure further comprises a conductive material disposed over the independent feedback contacts for electrically connecting various independent feedback contacts together.

6. The feedback circuit structure of claim 5, wherein the material constituting the conductive material comprises conductive plastics or solder blocks.

7. A backlight module, comprising:
a plurality of lamps, wherein each lamp has a power terminal a feedback terminal;
a driving module, coupled to the power terminals for driving the lamps;
a feedback circuit structure, having:
a substrate;
a plurality of tube contacts, disposed on the substrate, wherein each tube contact is coupled to one of the feedback terminals of the lamps;
a plurality of independent feedback contacts, disposed on the substrate, wherein each independent feedback contact is coupled to one of the tube contacts;
a common ground feedback contact, disposed on the substrate, wherein the common ground feedback contact is coupled to one of the independent feedback contacts; and
a plurality of feedback lines coupling various independent feedback contacts with the driving module.

8. The backlight module of claim 7, wherein the module further comprises an independent feedback plugging stand disposed on the substrate such that each independent feedback line is coupled to one of the independent feedback contacts through the independent feedback plugging stand.

9. The backlight module of claim 7, wherein the module further comprises a common ground feedback plugging stand disposed on the substrate such that the common ground feedback contacts are coupled to the common ground feedback plugging stand.

10. The backlight module of claim 7, wherein the driving module further comprises a mutually coupled powering device and a feedback controller such that the powering device is coupled to the lamps and the feedback controller is coupled to the feedback lines.

11. The backlight module of claim 7, wherein the lamps comprise cold cathode fluorescent lamps.

12. A backlight module, comprising:
a plurality of lamps, each having a power terminal and a feedback terminal;
a driving module, coupled to the power terminals for driving the lamps;
a feedback circuit structure, having:
a substrate;
a plurality of tube contacts, disposed on the substrate, wherein each tube contact is coupled to one of the feedback terminals of the lamps;
a plurality of independent feedback contacts, disposed on the substrate, wherein each independent feedback contact is coupled to one of the tube contacts and the independent feedback contacts are mutually connected together;
a common ground feedback contact, disposed on the substrate, wherein the common ground feedback contact is coupled to one of the independent feedback contacts; and
a feedback line, coupling the common ground feedback contact and the driving module.

13. The backlight module of claim 12, wherein the module further comprises an independent feedback plugging stand disposed on the substrate such that the independent feedback contacts are coupled to the independent feedback plugging stand.

14. The backlight module of claim 13, wherein the module further comprises a conductive cap plugged into the independent feedback plugging stand for connecting the independent feedback contacts together.

15. The backlight module of claim 12, wherein the module further comprises a common ground feedback plugging stand disposed on the substrate such that the feedback lines are coupled to the common ground feedback contacts through the common ground feedback plugging stand.

16. The backlight module of claim 12, wherein the module further comprises a conductive material disposed on the independent feedback contacts for electrically connecting various independent feedback contacts together.

17. The backlight module of claim 16, wherein the material constituting the conductive material comprises conductive plastics or solder blocks.

18. The backlight module of claim 12, wherein the driving module further comprises a mutually coupled powering device and a feedback controller such that the powering device is coupled to the lamps and the feedback controller is coupled to the feedback lines.

19. The backlight module of claim 12, wherein the lamps comprises cold cathode fluorescent lamps.

* * * * *